(12) United States Patent
Kato

(10) Patent No.: US 7,133,347 B2
(45) Date of Patent: Nov. 7, 2006

(54) INFORMATION OUTPUTTING APPARATUS AND METHOD, AND PRESENTATION MEDIUM FOR DIGITAL TELEVISION BROADCAST SYSTEMS

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/982,571

(22) Filed: Oct. 17, 2001

(65) Prior Publication Data

US 2002/0024908 A1 Feb. 28, 2002

Related U.S. Application Data

(62) Division of application No. 09/313,100, filed on May 17, 1999, now Pat. No. 6,404,711.

(30) Foreign Application Priority Data

May 19, 1998 (JP) ................. 10-136238

(51) Int. Cl.
G11B 7/00 (2006.01)
(52) U.S. Cl. ................. 369/53.34
(58) Field of Classification Search ............ 369/47.31, 369/53.31, 53.34, 59.25, 59.27, 47.23, 47.28, 369/59.26, 124.08; 725/141–142, 153; 386/55–62, 386/65, 98, 111, 131; 360/8, 13, 26, 51
See application file for complete search history.

(56) References Cited

U.S. PATENT DOCUMENTS

| 4,340,916 | A | 7/1982 | Menezes |
| 4,569,042 | A | 2/1986 | Larson |
| 4,807,224 | A | 2/1989 | Naron et al. |
| 5,146,448 | A | 9/1992 | Adachi et al. |
| 5,864,682 | A | 1/1999 | Porter et al. |
| 5,946,445 | A * | 8/1999 | Peters et al. ............... 386/52 |
| 6,044,197 | A * | 3/2000 | Smith et al. ............... 386/55 |
| 6,085,023 | A | 7/2000 | Hatanaka et al. |
| 6,134,378 | A | 10/2000 | Abe et al. |
| 6,148,135 | A | 11/2000 | Suzuki |
| 6,151,443 | A | 11/2000 | Gable et al. |
| 6,175,683 | B1 | 1/2001 | Sugimura et al. |
| 6,404,711 | B1 * | 6/2002 | Kato ................... 369/47.31 |

* cited by examiner

*Primary Examiner*—Brian E. Miller
*Assistant Examiner*—Peter Vincent Agustin
(74) *Attorney, Agent, or Firm*—Frommer Lawrence & Haug LLP; William S. Frommer; Thomas F. Presson

(57) ABSTRACT

Disclosed are an information outputting apparatus, an information outputting method and a presentation medium, wherein the information outputting apparatus having an extracting device for extracting a program clock reference and a transport packet from an input stream, a clock generating device for generating a clock signal synchronized with the program clock reference extracted by the extracting device, a time-stamp generating device for generating a time stamp in synchronization with the clock signal generated by the clock generating device, and an information generating device for generating information representing continuity of time stamps. As a result, a stream can be played back correctly and continuously even if discontinuity of time stamps exists.

17 Claims, 18 Drawing Sheets

TSP_extra_header(3 bytes)

transport packet EXCLUDING A sync_byte(187 bytes)

190 bytes

RECORDING FORMAT OF A transport packet

```
TSP_extra_header(){
     reserved                3bits
     time_stamp_counter      21bits
}
```

SYNTAX OF TSP_extra_header

FIG. 6

| A1 | A2 | A3 | A4 | A5 | ... | An | H1 | H2 | H3 | H4 | ... |
|---|---|---|---|---|---|---|---|---|---|---|---|
| PCR | | | PCR | | | | PCR | | PCR | | |
| TS1 | TS2 | TS3 | TS4 | TS5 | | TSn | TSI1 | TSI2 | TSI3 | TSI4 | |

↑ POINT OF DISCONTINUITY

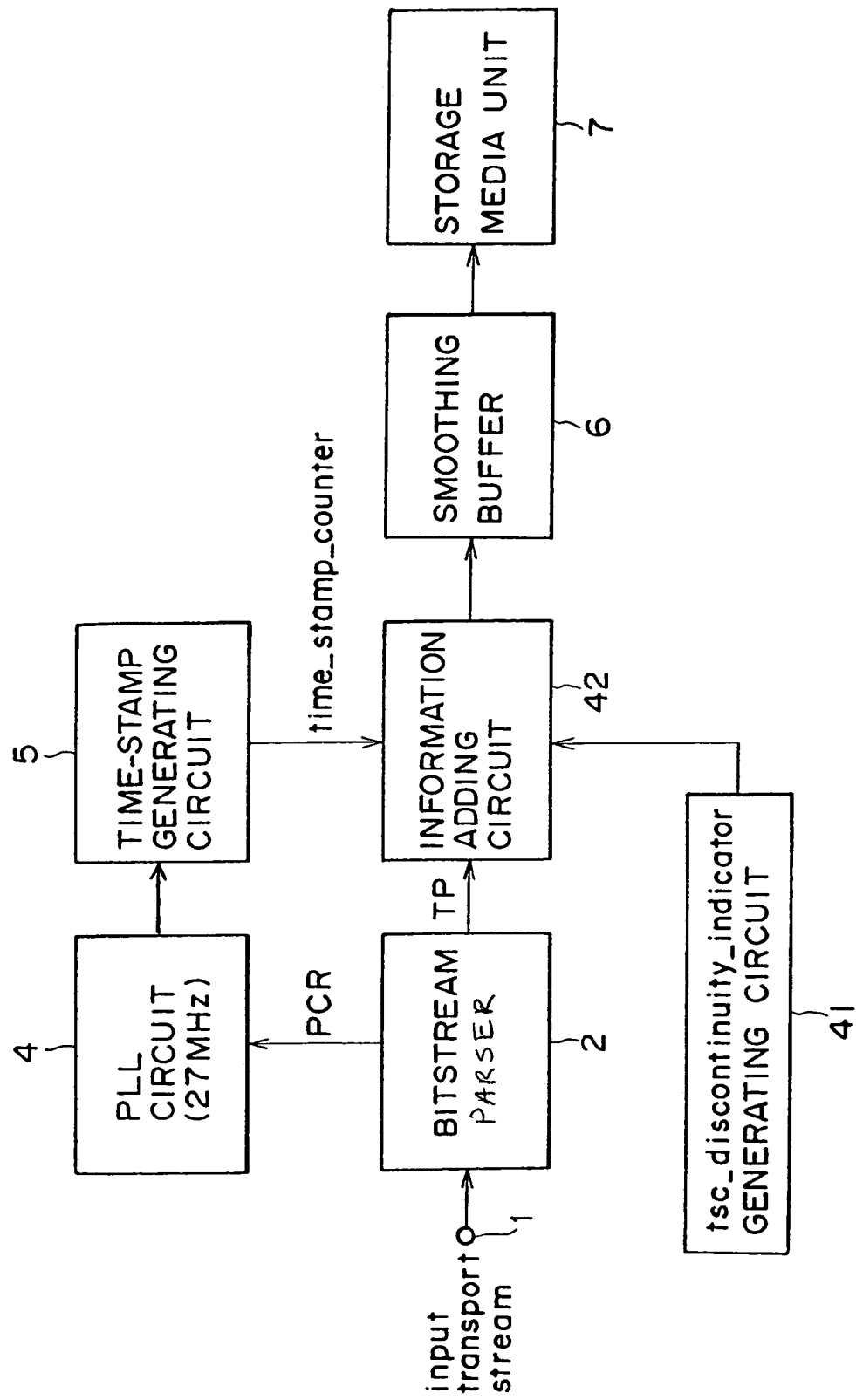

FIG. 8A

VDR_MPEG2_transport_stream

| Syntax | No. of bits | Mnemonic |
|---|---|---|
| VDR_MPEG2_transport_stream () { <br>    do { <br>        transport_packet () | 188*8 | bslbf |
|         if ( TSP_extra_information_flag ==1 ) <br>            TSP_extra_information () | 32 | bslbf |
|     } while ( nextbits () -- sync_byte ) <br>} | | |

FIG. 8B

```
VDR_MPEG2_transport_stream () {
    while ( End_of_file ) {
        if ( TSP_extra_information_flag ==1 )
            TSP_extra_information ()
        transport_packet ()
    }
}
```

FIG. 9

TSP_extra_information

| Syntax | No. of bits | Mnemonic |
|---|---|---|
| TSP_extra_information () <br>{ | | |
|     time_stamp_counter | 24 | uimsbf |
|     tsc_discontinuity_indicator | 1 | uimsbf |
|     copy_permission_indicator | 2 | uimsbf |
|     CCI_invalid_flag | 1 | uimsbf |
|     reserved | 4 | bslbf |
| } | | |

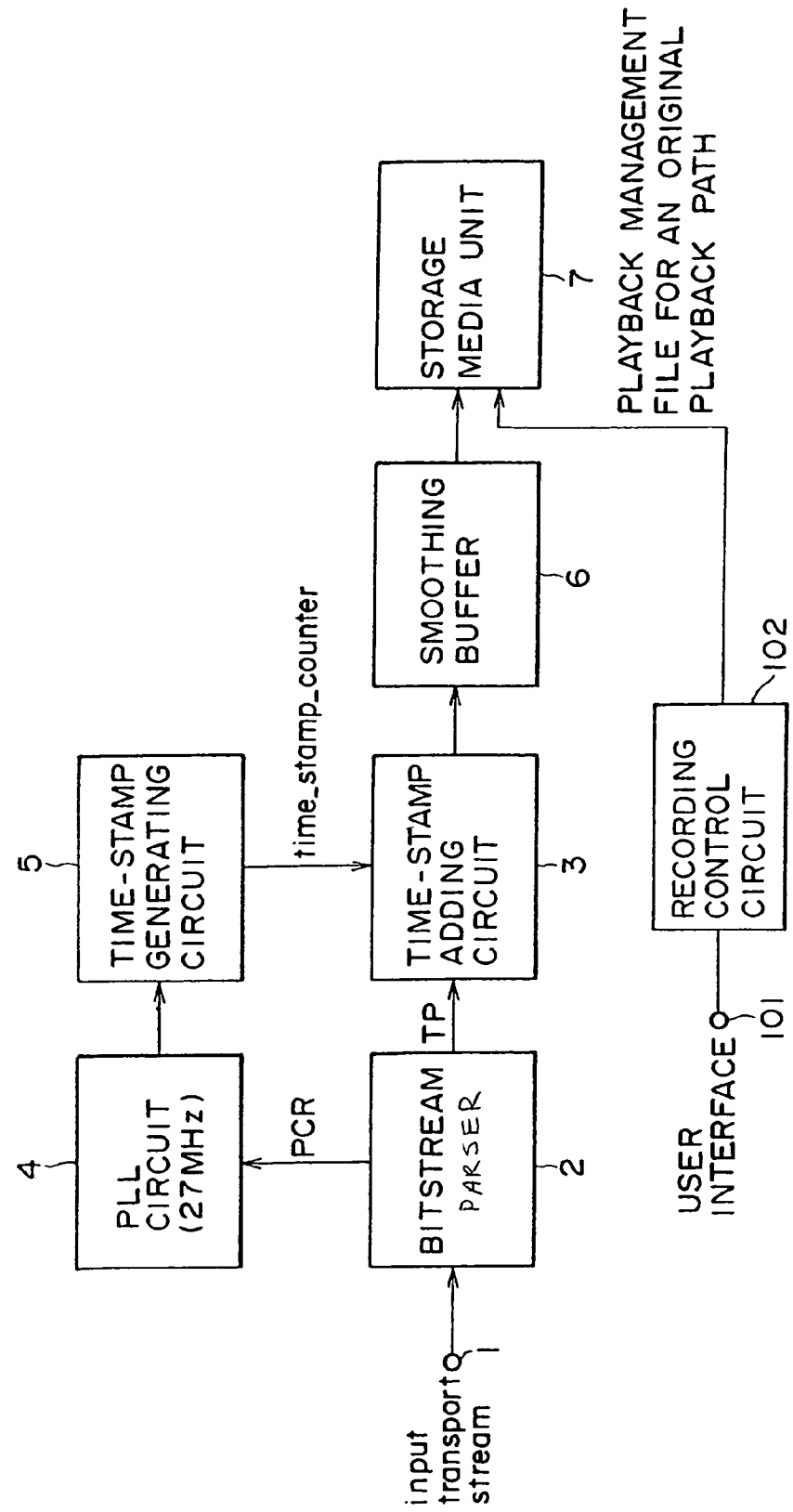

FIG. 15

PLAYBACK MANAGEMENT FILE
FOR AN EDITED PLAYBACK PATH

PLAYBACK PATHS

| | FILE NAME | TIMES | ADDRESSES |
|---|---|---|---|
| 1 | TRANSPORT STREAM 1 | A TO B | a TO b |
| 2 | TRANSPORT STREAM 1 | C TO D | c TO d |
| 3 | TRANSPORT STREAM 2 | E TO F | e TO f |

LOCATIONS AT WHICH DISCONTINUITY
OF TIME STAMPS IS GENERATED

AT A TIME A IN A TRANSPORT PACKET AT AN ADDRESS a
AT A TIME C IN A TRANSPORT PACKET AT AN ADDRESS c
AT A TIME E IN A TRANSPORT PACKET AT AN ADDRESS e

FIG. 17A

PLAYBACK MANAGEMENT FILE 1
FOR AN ORIGINAL PLAYBACK PATH

PLAYBACK PATH

| FILE NAME | TIMES | ADDRESSES |
|---|---|---|
| TRANSPORT STREAM 1 | O TO x | O TO X |

NO DISCONTINUITY OF TIME STAMPS

FIG. 17B

PLAYBACK MANAGEMENT FILE 2
FOR AN ORIGINAL PLAYBACK PATH

PLAYBACK PATH

| FILE NAME | TIMES | ADDRESSES |
|---|---|---|
| TRANSPORT STREAM 2 | O TO y | O TO Y |

NO DISCONTINUITY OF TIME STAMPS

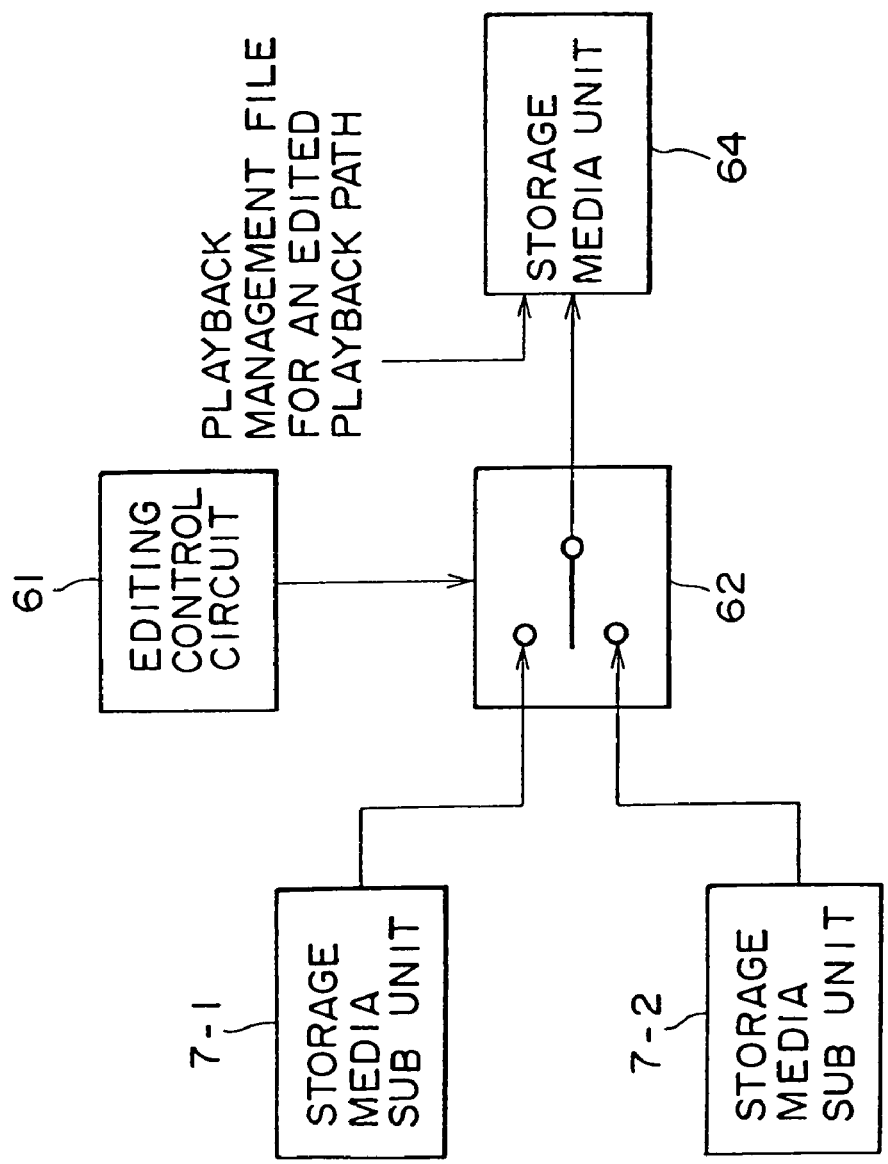

INFORMATION OUTPUTTING APPARATUS AND METHOD, AND PRESENTATION MEDIUM FOR DIGITAL TELEVISION BROADCAST SYSTEMS

CROSS REFERENCE TO RELATED APPLICATIONS

This application is a Divisional of U.S. Ser. No. 09/313,100, filed on May 17, 1999, now U.S. Pat. No. 6,404,711.

BACKGROUND OF THE INVENTION

In general, the present invention relates to an information outputting method, an information outputting apparatus adopting the method and a presentation medium for presenting the method. More particularly, the present invention relates to an information outputting apparatus capable of playing back a plurality of streams continuously with a high degree of reliability, an information outputting method adopted by the apparatus and a presentation medium for presenting the method.

In a digital television broadcast system such as a DVB (Digital Video Broadcasting) or a DTV (Digital Television), a transport stream of the MPEG2 systems (ISO/IEC 13818-1) is used in a multiplexing system. To be more specific, video and audio streams are multiplexed in a transport stream in transport-packet units each having a length of 188 bytes.

When transport packets of one or more television programs are extracted from a transport stream in which a plurality of television programs are multiplexed, the extracted transport packets appear at irregular intervals.

To put it in detail, in a stream transmitted through a satellite, transport packets of a plurality of channels are multiplexed as shown in FIG. 1. In the example shown in the figure, transport packets of 4 channels, namely, channels A to D, are multiplexed. Assuming that transport packets of channel A are extracted from the stream, timings with which transport packets $A_1$ to $A_5$ are generated are irregular. That is to say, an interval between two adjacent transport packets $A_i$ and $A_{i+1}$ varies from time to time.

When such transport packets $A_i$ are recorded into a recording medium at the irregular intervals as they were extracted, however, the storage area of the recording medium is not utilized efficiently. Thus, transport packets $A_i$ need to be recorded by closing gaps between them.

If transport packets $A_i$ are thus recorded by closing gaps between them, however, it is necessary to adjust timings, with which transport packets $A_i$ are output in an operation to play back the transport packets $A_i$ from the recording medium, to the timings to which the packets have been transmitted. Otherwise, timing to supply the packets to an T-STD (Transport-System Target Decoder) prescribed by the MPEG2 standards will be different from the timing to encode the packets. As a result, it will be quite within the bounds of possibility that the T-STD fails. A conceivable solution to this problem is to also record a time stamp Tsi representing timing of generation of each transport packet in the transport packet at the same time as shown in FIG. 1.

FIG. 2 is a block diagram showing a typical configuration of an apparatus for recording a transport stream by embracing such a principle. In a bitstream parser 2, a program clock reference (PCR) is read out from the header of a transport packet of a transport stream received through a terminal 1. The transport packet is supplied to a time-stamp adding circuit 3 while the PCR is supplied to a PLL (phase-locked loop) circuit 4. The PLL circuit 4 generates a clock signal with a frequency of 27MHz in synchronization with the PCR supplied thereto, outputting the clock signal to a timestamp generating circuit 5. The time-stamp generating circuit 5 counts the number of pulses of the clock signal and generates a time stamp (time_stamp_counter) corresponding to a count value to the time-stamp adding circuit 3 to output.

The time-stamp adding circuit 3 adds 3-byte TSP_extra_header to 187 bytes of the transport packet to generate a 190-byte block as shown in FIG. 3. The 187 bytes are obtained by removing a sync byte at the beginning of the original 188-byte transport packet. As shown in FIG. 4, TSP_extra_header includes 21-byte time_stamp_counter. time_stamp_counter represents a planned arrival time of the first bit of the first byte of the transport packet at a smoothing buffer defined in the ISO/IEC13818-1.

It should be noted that the format shown in FIG. 3 is a format for a transport-stream recording apparatus functioning as a digital VCR (Video Cassette Recorder) for use of consumer.

Data output by the time-stamp adding circuit 3 is supplied to a storage media unit 7 by way of a smoothing buffer 6 to be recorded therein.

A transport stream recorded in the storage media unit 7 in this way is played back by a playback apparatus having a configuration shown in FIG. 5. As shown in the figure, a transport stream played back from the storage media unit 7 is supplied to a time-stamp separating circuit 21 for separating a transport packet and time_stamp_counter from the transport stream. The transport packet is supplied to an output control circuit 23 whereas time_stamp_counter is supplied to a comparator 22 and a timing generating circuit 24.

In the timing generating circuit 24, the number of clock pulses generated by a clock generating circuit 25 at a frequency of 27 MHz is counted by a counter with the value of first time_stamp_counter used as an initial value. A count value representing a time stamp is supplied to the comparator 22. When the count value received from the timing generating circuit 24 becomes equal to the value of time_stamp_counter received from the time-stamp separating circuit 21, the comparator 22 controls the output control circuit 23 to output the transport packet received from the time-stamp separating circuit 21 to a terminal 26.

To be more specific, when the count value received from the timing generating circuit 24 is found equal to TS1 by the comparator 22, transport packet $A_1$ is output from the output control circuit 23. By the same token, when the count value received from the timing generating circuit 24 becomes equal to TS2, transport packet $A_2$ is output from the output control circuit 23. Thereafter, the same processing is repeated. Thus, transport packets $A_i$ are each output with the same timing as the encoding operation. As a result, it is possible to prevent the TSTD from failing.

When a stream of channel A and a stream of channel H are synthesized in editing work as shown in FIG. 6, however, continuity at a junction between the two streams is lost due to the fact that there is no relation between a time stamp TSn of the last transport packet $A_n$ of channel A and a time stamp TS11 of the first transport stream packet $H_1$ of channel H.

As a result, when data obtained as a result of editing a plurality of streams in this way and recorded on storage media is played back, at the junction between the last transport packet $A_n$ of channel A and the first transport packet $H_1$ of channel H, a time stamp output by the timing generating circuit 24 does not correspond to a time stamp output by the time-stamp separating circuit 21, raising a problem that it is no longer possible to correctly control the output control circuit 23.

SUMMARY OF THE INVENTION

It is thus an object of the present invention addressing the problem described above to provide a capability of outputting transport packets correctly and continuously even from data obtained as a result of synthesizing a plurality of streams.

To achieve the above object, according to a first aspect of the present invention, there is provided an information outputting apparatus including; an extracting means for extracting a program clock reference and a transport packet from an input stream, a clock generating means for generating a clock signal synchronized with the program clock reference extracted by the extracting means, a time-stamp generating means for generating a time stamp in synchronization with the clock signal generated by the clock generating means, and an information generating means for generating information representing continuity of time stamps.

According to a second aspect of the present invention, there is provided an information outputting method characterized in that the method includes the steps of; an extracting step for extracting a program clock reference and a transport packet from an input stream, a clock generating step for generating a clock signal synchronized with the program clock reference extracted at the extracting step, a time-stamp generating step for generating a time stamp in synchronization with the clock signal generated at the clock generating step, and an information generating step for generating information representing continuity of time stamps.

According to a third aspect of the present invention, there is provided a presentation medium, wherein the medium is used for presenting a program executable by a computer to drive an information outputting apparatus to carry out the processing of; an extracting step for extracting a program clock reference and a transport packet from an input stream, a clock generating step for generating a clock signal synchronized with the program clock reference extracted at the extracting step, a time-stamp generating step for generating a time stamp in synchronization with the clock signal generated at the clock generating step, and an information generating step for generating information representing continuity of time stamps.

According to a fourth aspect of the present invention, there is provided an information outputting apparatus characterized in that the apparatus includes a selecting means for selecting one of a plurality of streams, and a rewriting means which is used for rewriting information representing continuity of time stamps when one of plural streams is selected by the selecting means.

According to a fifth aspect of the present invention, there is provided an information outputting method characterized in that the method comprises a selecting step for selecting one of a plurality of streams, and a rewriting step which is executed to rewrite information representing continuity of time stamps when one of plural streams is selected at the selecting step.

According to a sixth aspect of the present invention, there is provided a presentation medium, wherein the medium is used for presenting a program executable by a computer to drive an information outputting apparatus to carry out the processing of; a selecting step of selecting one of a plurality of streams, and a rewriting step which is executed to rewrite information representing continuity of time stamps when a stream is selected at the selecting step.

According to a seventh aspect of the present invention, there is provided an information outputting apparatus including; a separating means for separating information representing continuity of time stamps, a time stamp and a transport packet, a generating means for generating a timing signal, a comparing means for comparing a timing signal generated by the generating means with a time stamp separated by the separating means, an output control means for controlling an operation to output a transport packet separated by the separating means in accordance with a result of comparison output by the comparing means, and a timing control means for controlling a timing signal generated by the generating means on the basis of information representing continuity of time stamps and a time stamp.

According to a eighth aspect of the present invention, there is provided an information outputting method including; a separating step for separating information representing continuity of time stamps, a time stamp and a transport packet, a generating step of generating a timing signal, a comparing step for comparing a timing signal generated at the generating step with a time stamp separated at the separating step, an output control step for controlling an operation to output a transport packet separated at the separating step in accordance with a result of comparison output at the comparing step, and a timing control step for controlling a timing signal generated at the generating step on the basis of information representing continuity of time stamps and a time stamp.

According to a ninth aspect of the present invention, there is provided a presentation medium, wherein the medium is used for presenting a program executable by a computer to drive an information outputting apparatus to carry out the steps of; a separating step for separating information representing continuity of time stamps, a time stamp and a transport packet, a generating step for generating a timing signal, a comparing step for comparing a timing signal generated at the generating step with a time stamp separated at the separating step, an output control step for controlling an operation to output a transport packet separated at the separating step in accordance with a result of comparison output at the comparing step, and a timing control step of controlling a timing signal generated at the generating step on the basis of information representing continuity of time stamps and a time stamp.

According to the information outputting apparatus, the information outputting method and the presentation medium of the present invention, it is advantageous in that since a program clock reference and a transport packet are extracted from an input stream, a clock signal synchronized with the program clock reference is generated, a time stamp is generated in synchronization with the clock signal generated and information representing continuity of time stamps is generated. As a result, it is possible to provide a stream that can be played back continuously even if discontinuity of time stamps exists.

According to the information outputting apparatus, the information outputting method and the presentation medium of the present invention, it is further advantageous in that since a time stamp and one of a plurality of streams are selected and information representing continuity of time stamps is rewritten when one of plural streams is selected. As a result, it is possible to provide a stream that can be played back continuously even if discontinuity of time stamps exists.

According to the information outputting apparatus, the information outputting method and the presentation medium of the present invention, it is still further advantageous in that since information representing continuity of time stamps, a time stamp and a transport packet are separated, a timing signal is generated and compared with the separated time stamp, and thus an operation to output the separated transport packet is controlled in accordance with a result of comparison and the generated timing signal is controlled on the basis of the separated information representing continuity of time stamps and the separated time stamp, thereby providing a stream capable of being played back continuously.

BRIEF DESCRIPTION OF THE DRAWINGS

FIG. 6 is an explanatory diagram used for describing discontinuity of time stamps;

FIG. 7 is a block diagram showing a typical configuration of a transport-stream recording apparatus provided by the present invention;

FIGS. 8A and 8B are explanatory diagrams used for describing VDR_MPEG2_transport_stream generated by an information adding circuit employed in the transport-stream recording apparatus shown in FIG. 7;

FIG. 9 is an explanatory diagram used for describing the structure of TSP_extra_information shown in FIGS. 8A and 8B;

FIG. 14 is a block diagram showing a typical configuration of a transport-stream recording apparatus provided by another embodiment of the present invention;

FIG. 15 is a diagram showing an example of a playback management file for an edited playback path;

FIGS. 17A and 17B are diagrams each showing a playback management file for an original playback path;

FIG. 18 is a block diagram showing a typical configuration of an edit apparatus provided by another embodiment of the present invention;

DETAILED DESCRIPTION OF THE PREFERRED EMBODIMENTS

FIG. 7 is a block diagram showing a typical configuration of a transport-stream recording apparatus accompanying drawings.

Figure 1:
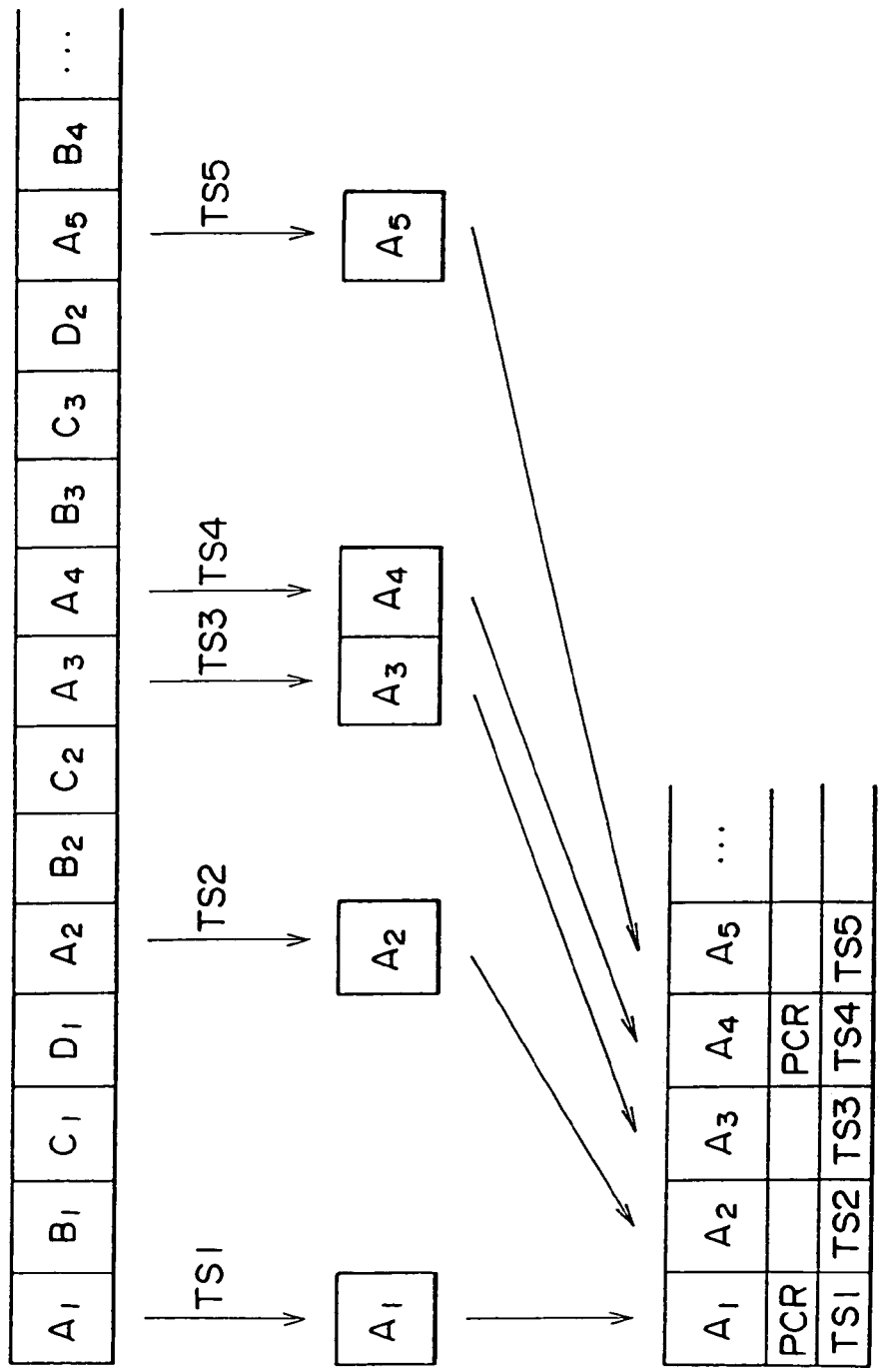
FIG. 1 is an explanatory diagram used for describing a time stamp.
Figure 2:
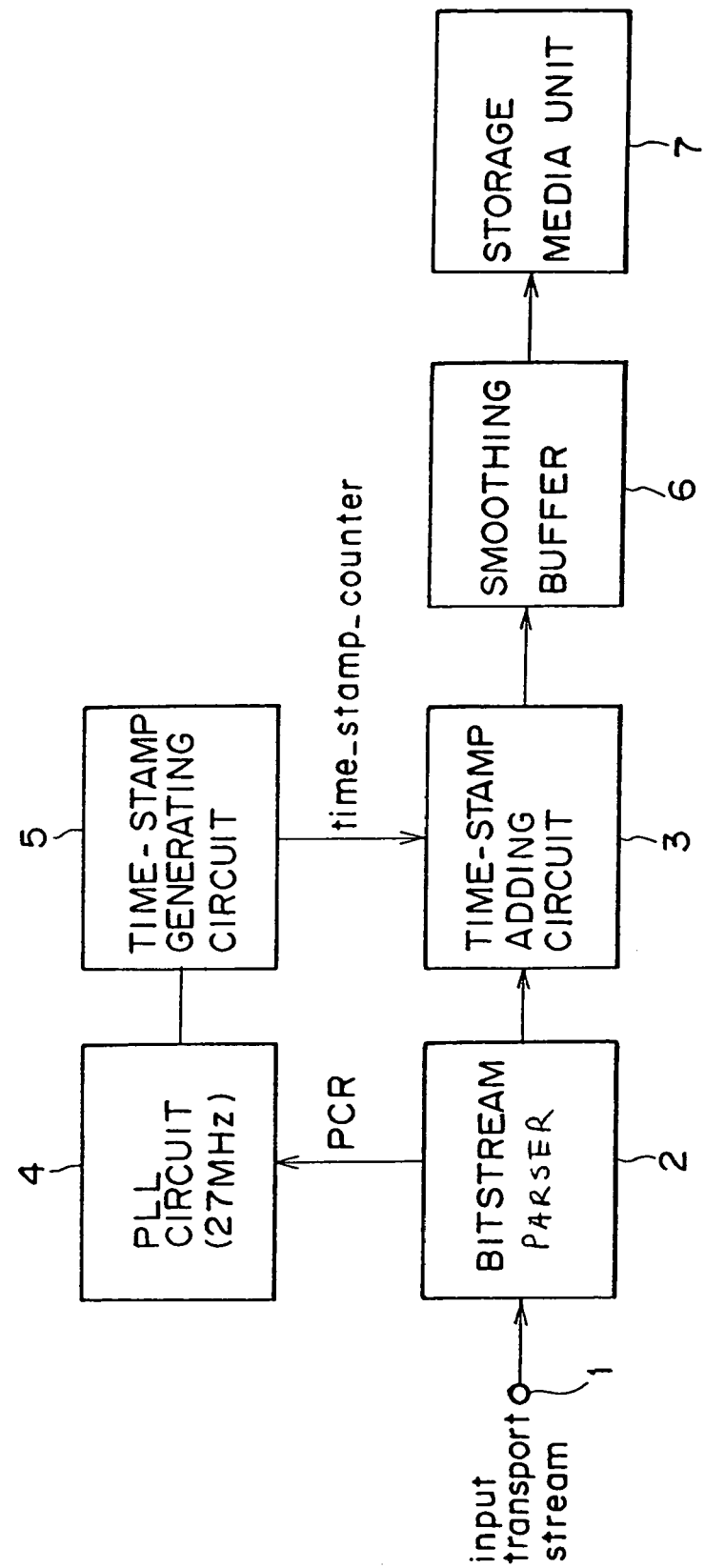
FIG. 2 is a block diagram showing a typical configuration of the related art transport-stream recording apparatus.
Figures 3, 4:
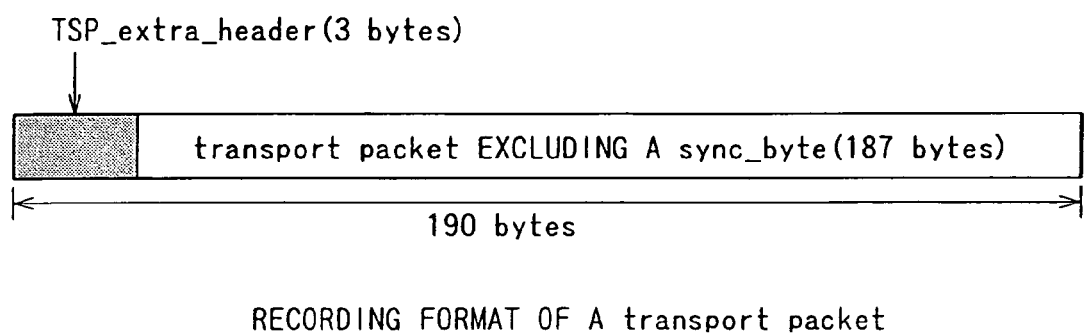
FIG. 3 is an explanatory diagram used for describing the format of a transport packet output by a time-stamp adding circuit employed in the transport-stream recording apparatus shown in FIG. 2.
FIG. 4 is an explanatory diagram used for describing the structure of TSP_extra_header shown in FIG. 3.

FIG. 7 is a block diagram showing a typical configuration of a transport-stream recording apparatus applying the principle of an information outputting apparatus provided by the present invention. Components identical with those shown in FIG. 2 are denoted by the same reference numerals as the latter and their explanation is omitted appropriately. The typical configuration is different from that shown in FIG. 2 in that the time-stamp adding circuit 3 shown in FIG. 2 is replaced by an information adding circuit 42 which receives tsc_discontinuity_indicator output by a newly added generating circuit 41. The rest of the typical configuration is just the same as that shown in FIG. 2.

Next, the operation of the transport-stream recording apparatus shown in FIG. 7 is explained. A transport stream of one or more programs extracted from a transport stream including a plurality of multiplexed television programs is supplied to a terminal 1. The transport stream supplied to the terminal 1 is forwarded to a bitstream parser 2. In the bitstream parser 2, a program clock reference (PCR) is read out from the header of a transport packet of a transport stream received through the terminal 1. The transport packet is supplied to an information adding circuit 42 while the PCR is supplied to a PLL (phase-locked loop) circuit 4. The PLL circuit 4 generates a clock signal with a frequency of 27MHz in synchronization with the PCR supplied thereto, outputting the clock signal to a time-stamp generating circuit 5. The time-stamp generating circuit 5 counts the number of pulses of the input clock signal by using an embedded counter, generating a time stamp (time-stamp counter) corresponding to a count value to output to the information adding circuit 42.

The generating circuit 41 generates tsc_discontinuity_indicator, that is, a flag always having a value of 0 to indicate that pieces of time_stamp_counter are continuous, outputting the flag to the information adding circuit 42. The information adding circuit 42 records a transport packet received from the bitstream parser 2 as VDR_MPEG2_transport_stream with a format shown in FIG. 8A. As shown in the figure, VDR_MPEG2_transport_stream includes TSP_extra_information( ) in addition to transport packet( ). As shown in FIG. 9, TSP_extra_information( ) includes time_stamp_counter output by the time-stamp generating circuit 5 and tsc_discontinuity_indicator output by the generating circuit 41. In this example, time_stamp_counter and tsc_discontinuity_indicator are 24 bits and 1 bit in length, respectively.

It should be noted that TSP_extra_information( ) can also be added in front of a transport packet as shown in FIG. 8B.

The information adding circuit 42 adds time_stamp_counter output by the time-stamp generating circuit 5 and tsc_discontinuity_indicator output by the generating circuit 41 to a transport packet received from the bitstream parser 2, supplying the transport packet along with time_stamp_counter and tsc_discontinuity_indicator added thereto to a storage media unit 7 to be recorded therein by way of the smoothing buffer 6.

Figure 10:
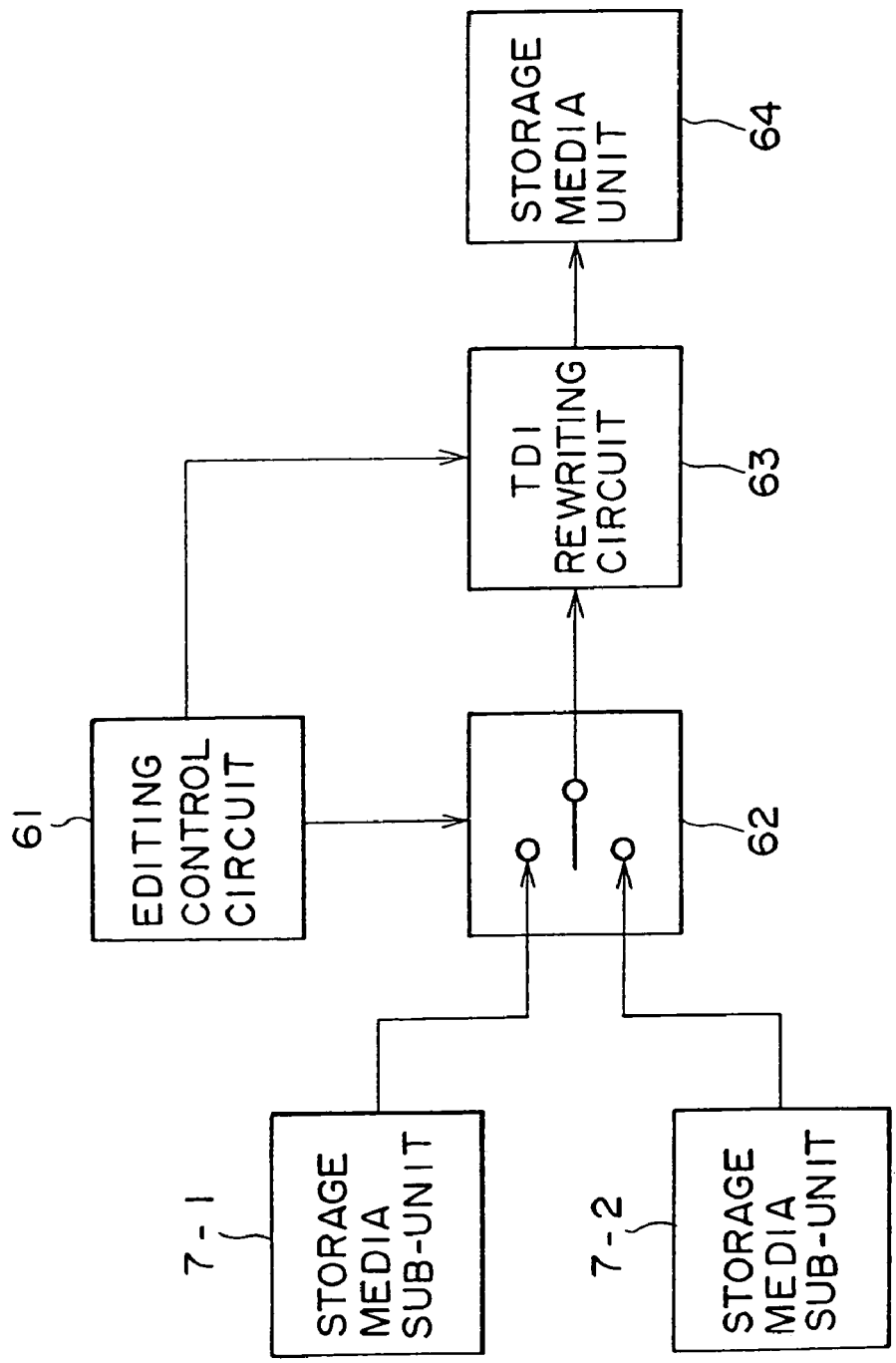
FIG. 10 is a block diagram showing a typical configuration of an edit apparatus provided by the present invention.

FIG. 10 is a block diagram showing a typical configuration of an edit apparatus for editing a transport stream recorded on the storage media unit 7 as described above. In this typical configuration, an output of either a storage media sub-unit 7-1 or a storage media sub-unit 7-2 is supplied to a TDI (tsc_discontinuity_indicator) rewriting circuit 63 by way of a switch 62. An editing control circuit 61 carries out editing by controlling the switch 62 to select the output of either the storage media sub-unit 7-1 or the storage media sub-unit 7-2. When editing work is carried out by properly setting the switch 62, the editing control circuit 61 controls the TDI rewriting circuit 63 to rewrite the tsc_discontinuity_indicator flag of a transport stream supplied to the TDI rewriting circuit 63, outputting the transport stream with the flag rewritten to a storage media unit 64 to be recorded therein.

It should be noted that, a plurality of a transport-stream files can also be recorded in a single storage media unit of the configuration shown in FIG. 10 and editing work is carried out on these files.

Figure 11:
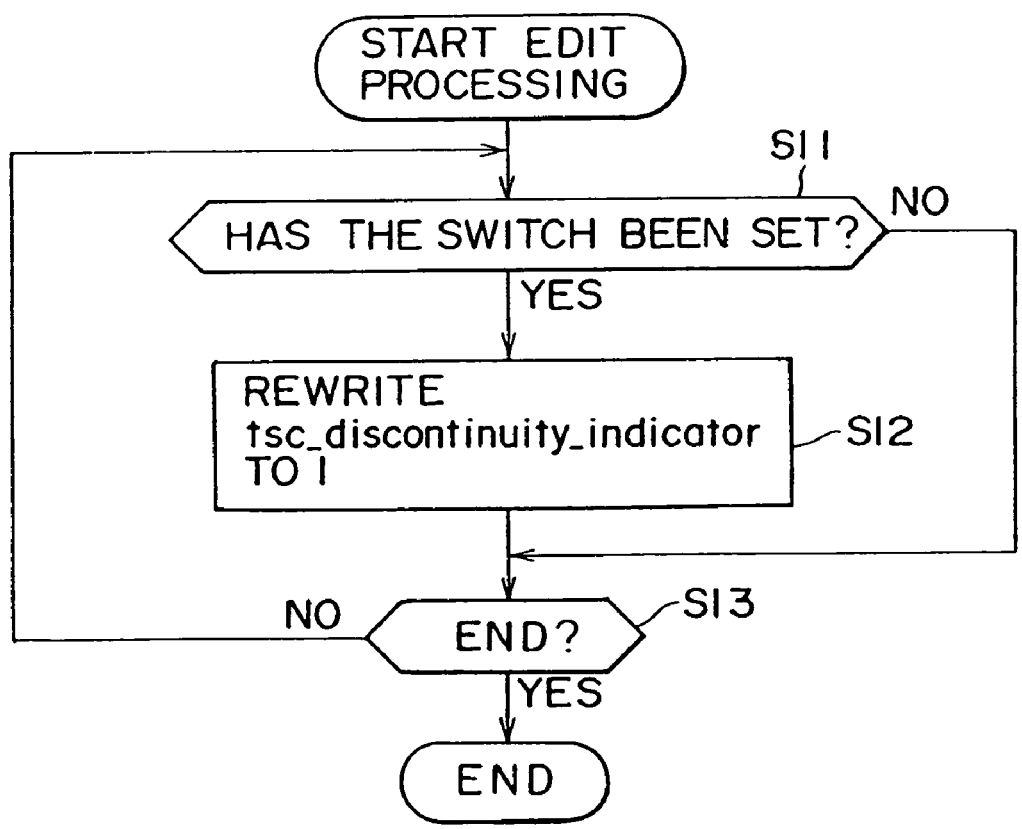
FIG. 11 is a flowchart representing an operation carried out by an editing control circuit employed in the edit apparatus shown in FIG. 10.

Next, the operation of the edit apparatus shown in FIG. 10 is explained by referring to a flowchart shown in FIG. 11. As described above, the editing control circuit 61 controls the switch 62 to select an output obtained as a result of playing back a transport stream from either the storage media sub-unit 7-1 or the storage media sub-unit 7-2 and supplies the selected output to the TDI rewriting circuit 63. As shown in FIG. 11 the flowchart begins with a step S11 at which the editing control circuit 61 forms a judgment as to whether or not the switch 62 has been set to select a transport stream.

If the outcome of the judgment formed at the step S11 indicates that the switch 62 has been controlled to select a transport stream, the flow of the operation goes to a step S12 at which the editing control circuit 61 controls the TDI rewriting circuit 63 to rewrite the tsc_discontinuity_indicator flag of the transport stream supplied through the switch 62 at value of 1 to indicate discontinuity of time_stamp_counter.

After completing the processing in the step S12 or if the outcome of the judgment formed at the step S11 indicates that the switch 62 has not been controlled to select a transport stream, the flow of the operation proceeds to a step S13 to form a judgment as to whether or not the end of the transport stream supplied by the switch 62 has been reached. If the end of the transport stream has not yet been reached, the flow of the operation goes back to the step S11 to repeat the processing of the step 11 and the subsequent steps. If the outcome of the judgment formed at the step S13 indicates that the end of the transport stream has been reached, on the other hand, the operation represented by the flowchart shown in FIG. 11 is ended.

As described above, a transport stream with the tsc_discontinuity_indicator flag thereof rewritten by the TDI rewriting circuit 63 as necessary is supplied to the storage media unit 64 to be recorded therein.

Figure 5:
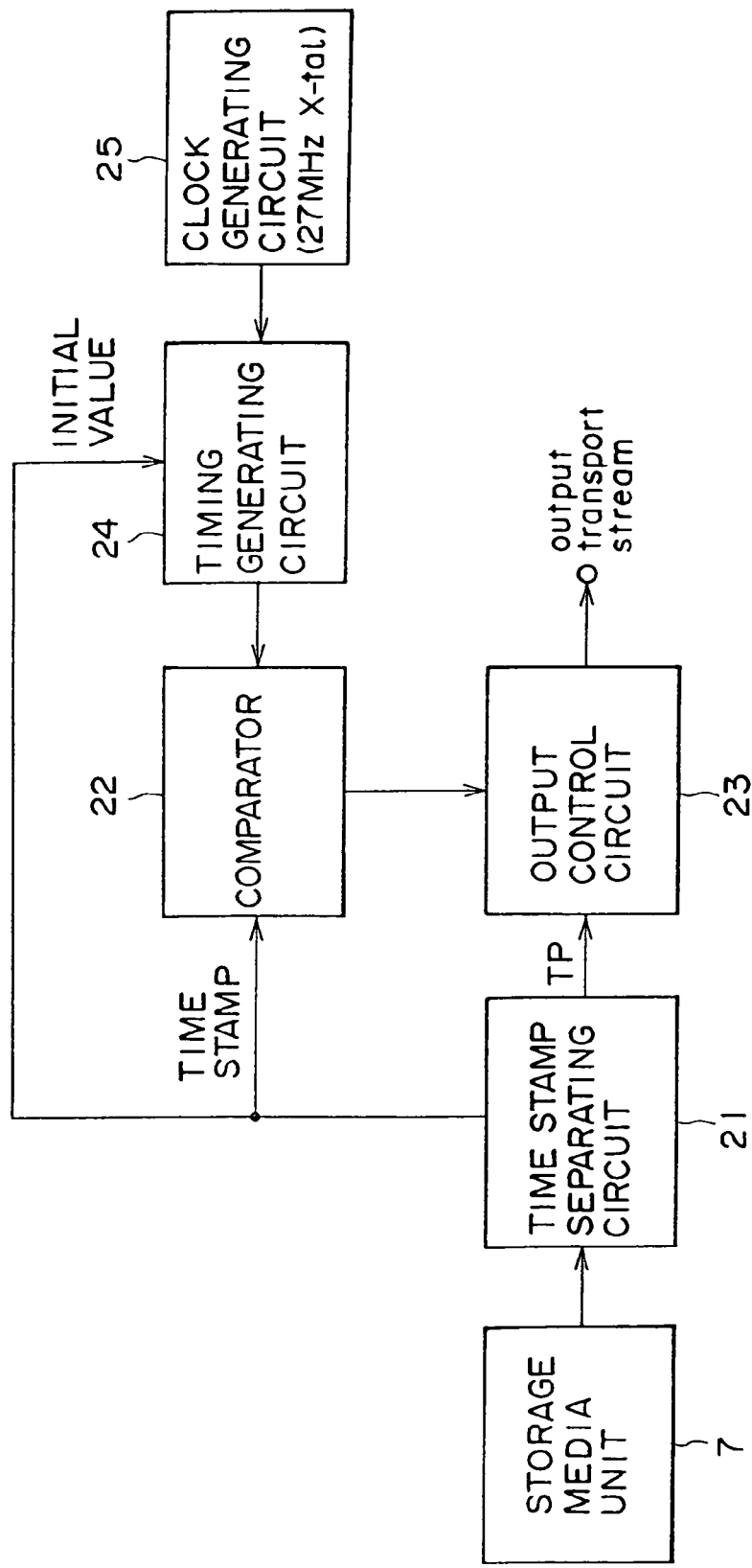
FIG. 5 is a block diagram showing a typical configuration of the related art transport-stream playback apparatus.
Figure 12:
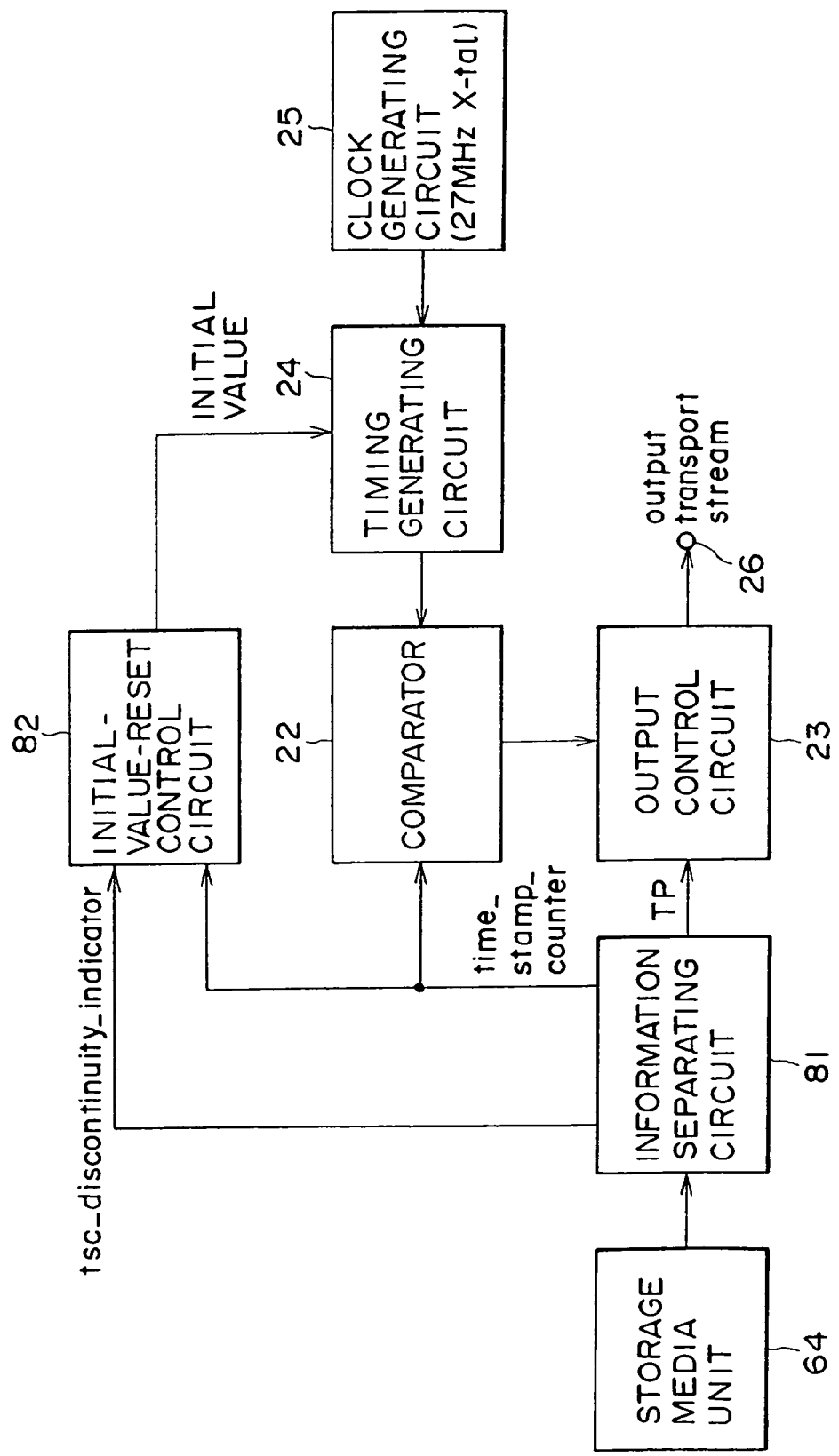
FIG. 12 is a block diagram showing a typical configuration of a transport-stream playback apparatus provided by the present invention.

FIG. 12 is a block diagram showing a typical configuration of a transport-stream playback apparatus for playing back a transport stream recorded on the storage media unit 64 as described above. Components employed in the typical configuration shown in FIG. 12 identical with those shown in FIG. 5 are denoted by the same reference numerals as the latter and their explanation is omitted appropriately. In this playback apparatus, a transport stream played back from the storage media unit 64 is supplied to an information separating circuit 81 for extracting a transport packet, the tsc_discontinuity_indicator flag and time_stamp_counter from the transport stream. The transport packet and the tsc_discontinuity_indicator flag are supplied to an output control circuit 23 and an initial-value-reset control circuit 82 respectively. time_stamp_counter is supplied to the initial-value-reset control circuit 82 and a comparator 22. With the tsc_discontinuity_indicator flag set at 1, the initial-value-reset control circuit 82 resets a timing generating circuit 24, setting the value of time stamp_counter therein as an initial value. The rest of the configuration is just the same as that shown in FIG. 5.

Next, the operation of the transport-stream playback apparatus shown in FIG. 12 is explained. As described above, a transport stream played back from the storage media unit 64 is supplied to the information separating circuit 81 which extracts a transport packet from the transport stream and supplies the packet to the output control circuit 23. The information separating circuit 81 also extracts the tsc_discontinuity_indicator flag from the transport stream, supplying the flag to the initial-value-reset control circuit 82. In addition, the information separating circuit 81 also extracts time_stamp_counter from the transport stream, supplying time_stamp_counter to the initial-value-reset control circuit 82 and the comparator 22.

The timing generating circuit 24 counts the number of pulses of a clock signal generated by a clock generating circuit 25 at a frequency of 27 MHz by using an embedded counter, outputting a count value representing a time stamp to the comparator 22. The comparator 22 compares the count value with the value of time_stamp_counter received from the information separating circuit 81. If the count value matches with time_stamp_counter, the comparator 22 controls the output control circuit 23 to output a transport packet received from the information separating circuit 81 to a terminal 26. This processing is the same as that carried out by the playback apparatus shown in FIG. 5.

Figure 13:
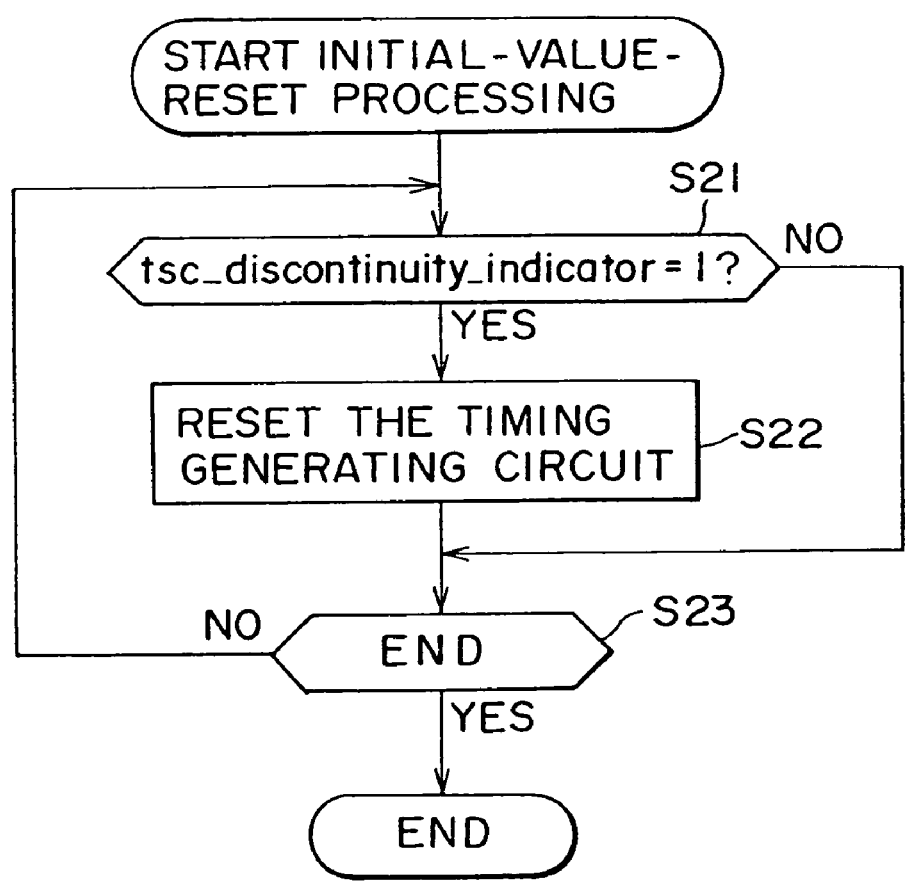
FIG. 13 is a flowchart representing an operation carried out by an initial-value-reset control circuit employed in the transport-stream playback apparatus shown in FIG. 12.

The initial-value-reset control circuit 82 carries out a processing represented by a flowchart shown in FIG. 13. As shown in the figure, the flowchart begins with a step S21 to form a judgment as to whether or not the tsc_discontinuity_indicator flag received from the information separating circuit 81 is 1. If the flag is found not 1, that is, if the flag is 0, the flow of the processing goes to a step S23 to be described later. Thus, if the flag is 0, the same processing as the related art apparatus is carried out.

If the outcome of the judgment formed at the step S21 indicates that the flag is 1, on the other hand, the flow of the processing proceeds to a step S22, at which the initial-value-reset control circuit 82 resets the timing generating circuit 24 and supplies the value of time stamp counter received from the information separating circuit 81 to the timing generating circuit 24. The value of time_stamp_counter received by the timing generating circuit 24 is set in the counter embedded in the timing generating circuit 24 as an initial value. In this way, the timing generating circuit 24 thereafter generates time stamps by using the initial value set in the counter as a reference.

A result of updating the contents of the counter with a new initial value is exemplified by a case shown in FIG. 6. Prior to timing to output the transport packet $H_1$ after the transport packet $A_n$, TS11, that is, the value of time_stamp_counter for the transport packet $H_1$, is set as an initial value in the counter embedded in the timing generating circuit 24. Thereafter, the counter counts the number of clock pulses by using the initial value TS11 as a reference. Thus, the timing generating circuit 24 thereafter generates time stamps each matching with a time stamp of channel H with correct timing. As a result, the output control circuit 23 is capable of outputting transport packets with correct timing even if discontinuity of values of time_stamp_counter has been detected.

Note that when a transport packet having the tsc_discontinuity_indicator flag thereof set at 1 is detected, it is desirable to drive the output control circuit 23 to output a particular transport packet having the tsc_discontinuity_indicator flag thereof set at 1 with proper timing, that is, after a predetermined period of time has lapsed since a packet immediately preceding the particular transport packet was output by the output control circuit 23. To put it concretely, the predetermined period of time is set typically at one second. The one-second period of time is a maximum period to complete an operation carried out by a buffer on the receiving (decoder) side to decode data output by the output control circuit 23 before the transport packet with the tsc_discontinuity_indicator flag thereof set at 1 is output. It should be noted that the MPEG2 Systems specifications prescribe that a transport packet shall be decoded within one second after the transport packet is supplied to a reception buffer of a decoder. By driving the output control circuit 23 to output a transport packet with the tsc_discontinuity_indicator flag thereof set at 1 after a one-second period of time has lapsed since a packet immediately preceding the particular transport packet was output by the output control circuit 23, there will be by no means an overflow generated in the reception buffer of the decoder. Note that, before outputting a transport packet with the tsc_discontinuity_indicator flag thereof set at 1 to an IEEE1394 digital interface, it is desirable to transmit a transport packet of a DIT (Discontinuity Information Table) prescribed in a DVB standard (EN 300 468) to the receiving side.

As described above, if the outcome of the judgment formed at the step S21 indicates that the value of the tsc_discontinuity_indicator flag is not 1, that is, if the flag is 0, or after the reset processing carried out by the timing generating circuit 24 at the step S22 has been completed, the flow of the processing goes to the step S23 to form a judgment as to whether or not the end of the transport stream has been reached. If the end of the transport stream has been reached, the processing represented by the flowchart shown in FIG. 13 is ended. Otherwise, the flow of the processing goes back to the step S21 to repeat the processing of the step 21 and the subsequent steps.

In the transport-stream recording apparatus with a configuration shown in FIG. 7, tsc_discontinuity_indicator is added to a transport packet as information indicating that the transport packet involves discontinuity of time stamps as described above. It should be noted, however, the ways to record such information are not limited to recording the information in a transport packet. tsc_discontinuity_indicator can also be recorded in a file separate from and independent of the transport stream (files) itself For example, information indicating that a transport packet of a transport stream stored in storage media involves discontinuity of time stamps can be controlled by using a playback management file stored in the storage media to represent playback data of the transport stream.

FIG. 14 is a diagram showing the configuration of an embodiment implementing a transport-stream recording apparatus for this case. Components identical with those shown in FIG. 2 are denoted by the same reference numerals as the latter and their explanation is omitted appropriately. A recording control circuit 102 stores a playback management file of an original playback path corresponding to a transport stream in a storage media unit 7 during a period of time from a recording start time to a recording end time specified through a user interface 101.

Figure 16A:
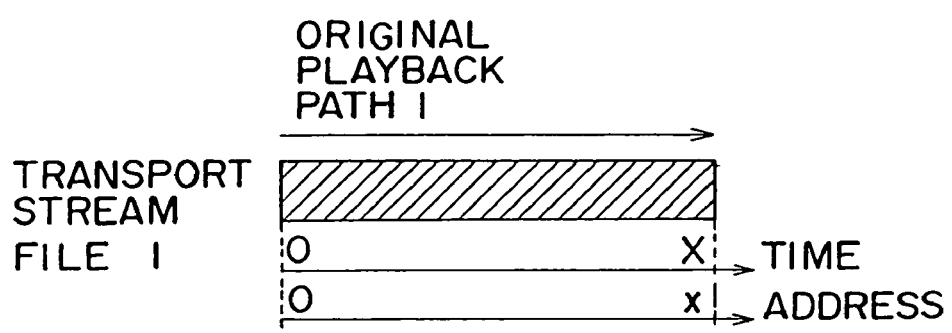
FIGS. 16A and 16B are diagrams each showing a transport-stream file.
Figure 16B:
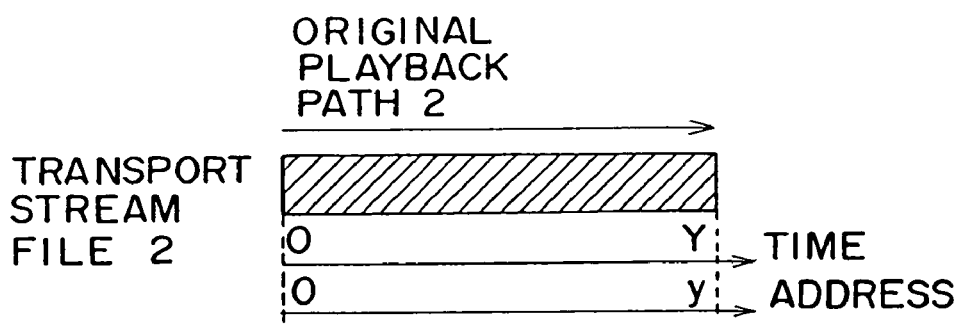

For example, when transport-stream files shown in FIGS. 16A and 16B are recorded in the storage media unit 7, their playback management files shown in FIGS. 17A and 17B respectively are also recorded in the storage media unit 7. The original playback management files each include a file name, times and addresses but not information representing discontinuity of time stamps.

Figure 20:
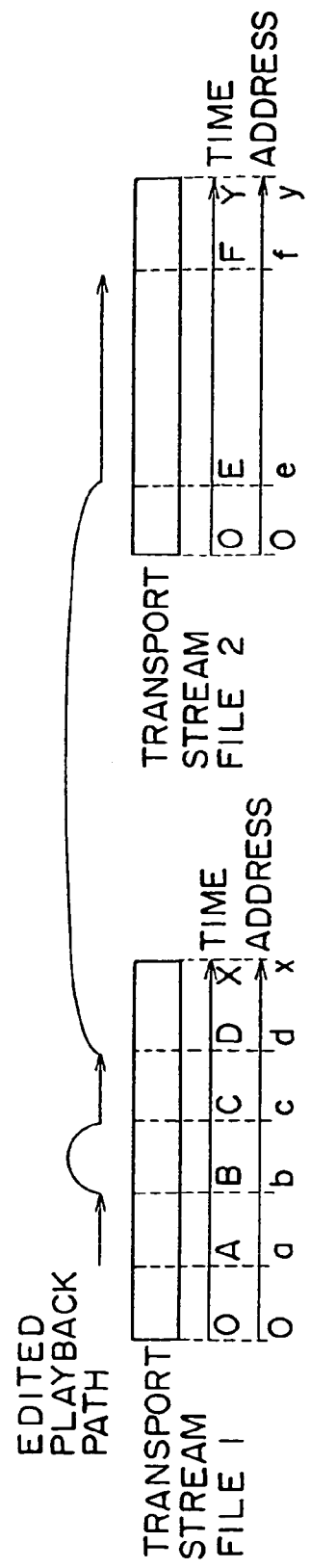
FIG. 20 is a diagram showing an example of a playback path.

FIG. 18 is a diagram showing a typical configuration of an edit apparatus for editing transport streams recorded in the storage media unit 7. Information on a transport packet involving discontinuity of time stamps is stored in a storage media unit 64 as a playback management file for the edited playback path. For example, when a playback path shown in FIG. 20 is specified, a playback management file for an edited playback path shown in FIG. 15 is recorded in the storage media unit 64. The playback management file includes file names, times and addresses for the edited playback path as well as locations or points of time at each of which discontinuity of time stamps is generated.

It should be noted that transport-stream file 1 and transport-stream file 2 shown in FIGS. 16A and 16B can also be recorded in one storage media unit.

Figure 19:
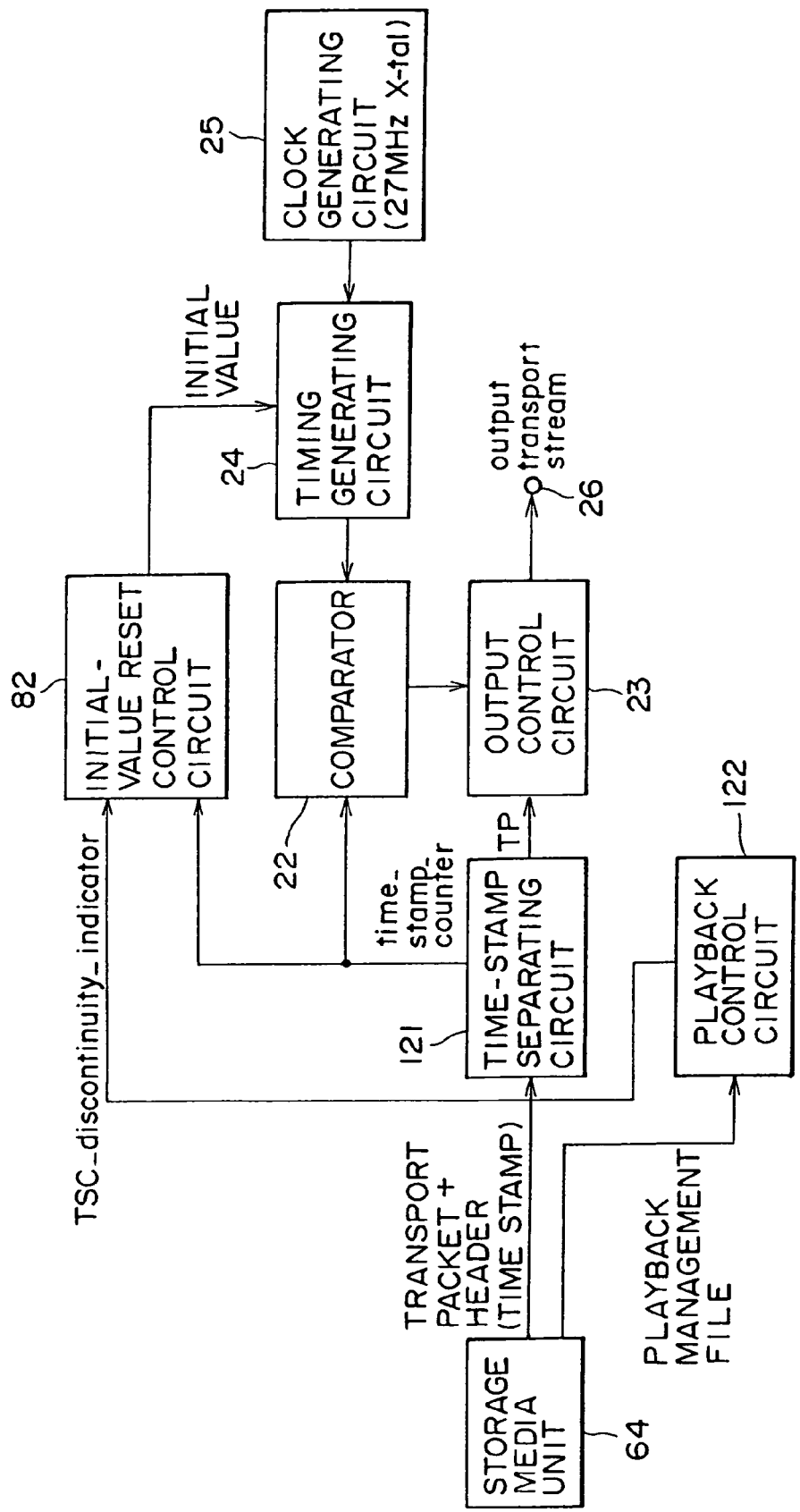
FIG. 19 is a block diagram showing a typical configuration of a transport-stream playback apparatus provided by another embodiment of the present invention.

A transport-stream playback apparatus in this case has a typical configuration like one shown in FIG. 19. In the case of the transport-stream playback apparatus shown in FIG. 12, information on discontinuity of time stamps is obtained from information added to a transport packet. In the case of the transport-stream playback apparatus shown in FIG. 19, on the other hand, information indicating a transport packet involving discontinuity of time stamps is fetched from a playback management file.

Prior to an operation to play back a transport stream, a playback control circuit 122 reads out the playback management file from the storage media unit 64 and supplies a signal for resetting an initial-value-reset control circuit 82. The signal is based on a value of a time stamp added to a transport packet involving discontinuity of time stamps.

A time-stamp separating circuit 121 reads out a transport packet from a storage media unit 64 on the basis of a playback path shown in FIG. 20, outputting the transport packet to an output control circuit 23 and supplies time_stamp_counter to the initial-value-reset control circuit 82 and a comparator 22.

As described above, even if discontinuity of time stamps exists, by recording tsc_discontinuity_indicator in a stream separate from a transport stream using a transport-stream recording apparatus with a configuration shown in FIG. 14, the transport stream can be output correctly provided that the stream is played back by using a transport-stream recording apparatus with a configuration shown in FIG. 19.

It should be noted that the term "system" used in this specification means the whole equipment comprising a plurality of apparatuses.

It is also worth noting that, as a presentation medium for presenting a program to be executed by a computer to carry out the processing described above to the user, a communication medium such as a network or a satellite can be used in addition to a recording medium such as a magnetic disc, a CD-ROM or a solid-state memory.

What is claimed is:

1. A recording apparatus comprising:
   an extractor operable to extract a program clock reference from a received transport stream;
   a clock generator operable to generate an external clock signal synchronized with said program clock reference;
   a time-stamp generator operable to generate an arrival time stamp corresponding to a time of receipt of a transport packet in synchronization with said external clock signal;

a formatting unit operable to add said arrival time stamp to the transport packet;

an information generator operable to generate information representative of a transport packet corresponding to discontinuity of the added arrival time stamps in the transport stream; and a recording unit operable to store said transport packet that includes the added arrival time stamps and the information corresponding to discontinuity of the added arrival time stamps on a storage medium;

wherein when said arrival time stamp located in said storage medium is discontinuous, time of receipt timing outputs of the transport packet received from said information generator are controlled in accordance with the discontinuity information.

2. A recording apparatus comprising:

a time-stamp generator operable to generate a sequential time stamp corresponding to a time of receipt in response to an external clock;

a formatting unit operable to add said time stamp indicating arrival time of each transport packet to the transport packet;

an information generator operable to generate information indicative of positional information of the transport packet corresponding to discontinuity of the added time stamps;

a recording unit operable to record said positional information along with the input transport packet; and a recording unit operable to store said transport packet that includes the added arrival time stamps and the information corresponding to discontinuity of the added arrival time stamps on a storage medium;

wherein when the arrival time stamp located in said storage medium is discontinuous, time of receipt timing outputs of the transport packet received from said information generator are controlled in accordance with the discontinuity information.

3. The recording apparatus according to claim 2, wherein a recording control circuit stores a playback management file of an original playback path corresponding to a transport stream in a storage media unit.

4. The recording apparatus according to claim 3, wherein said playback management file includes file names, times and addresses of an edited playback path and locations or points of time at each of which discontinuity of time stamps is generated.

5. A recording apparatus comprising:

a time-stamp generator operable to generate an arrival time stamp corresponding to a time of receipt indicative of arrival time of a received transport packet in synchronization with an external clock signal;

a formatting unit operable to add said arrival time stamp to the received transport packet;

an information generator operable to generate information indicating a discontinuity of the generated arrival time stamp in the transport stream; and a recording unit operable to store said transport packet that includes the added arrival time stamps and the information corresponding to discontinuity of the added arrival time stamps on a storage medium;

wherein when the arrival time stamp located in said storage medium is discontinuous, time of receipt timing outputs of the transport packet received from said information generator are controlled in accordance with the discontinuity information.

6. The recording apparatus according to claim 5, wherein a recording control circuit stores a playback management file of an original playback path corresponding to a transport stream in a storage media unit.

7. The recording apparatus according to claim 6, wherein said playback management file includes file names, times and addresses of an edited playback path and locations or points of time at each of which discontinuity of time stamps is generated.

8. A method for recording, comprising the steps of:

extracting a program clock reference from a received transport stream;

generating an external clock signal synchronized with said program clock reference;

generating an arrival time stamp corresponding to a time of receipt of a transport packet in synchronization with said external clock signal;

formatting to add said arrival time stamp to the transport packet;

generating information representative of a transport packet corresponding to discontinuity of the added arrival time stamps in the transport stream by using an information generator; and recording on a recording unit operable to store said transport packet that includes the added arrival time stamps and the information corresponding to discontinuity of the added arrival time stamps on a storage medium;

wherein when said arrival time stamp located in said storage medium is discontinuous, time of receipt timing outputs of the transport packet received from said information generator are controlled in accordance with the discontinuity information.

9. A The method according to claim 8, wherein a recording control circuit stores a playback management file of an original playback path corresponding to a transport stream in a storage media unit.

10. A The method according to claim 9, wherein said playback management file includes file names, times and addresses of an edited playback path and locations or points of time at each of which discontinuity of time stamps is generated.

11. A method for recording, comprising the steps of:

generating a sequential time stamp corresponding to a time of receipt in response to an external clock;

formatting to add said time stamp indicating arrival time of each transport packet to the transport packet;

generating information indicative of positional information of the transport packet corresponding to discontinuity of the added time stamps by using an information generator;

recording said positional information along with the input transport packet; and recording on a recording unit operable to store said transport packet that includes the added arrival time stamps and the information corresponding to discontinuity of the added arrival time stamps on a storage medium;

wherein when the arrival time stamp located in said storage medium is discontinuous, time of receipt timing outputs of the transport packet received from said information generator are controlled in accordance with the discontinuity information.

12. The method according to claim 11, wherein a recording control circuit stores a playback management file of an original playback path corresponding to a transport stream in a storage media unit.

13. The method according to claim 12,
wherein said playback management file includes file names, times and addresses of an edited playback path and locations or points of time at each of which discontinuity of time stamps is generated.

14. A method for recording, comprising the steps of:
generating an arrival time stamp indicative of an arrival time corresponding to a time of receipt of a received transport packet in synchronization with an external clock signal;
formatting to add said arrival time stamp to the received transport packet;
generating information indicating a discontinuity of the generated arrival time stamp in the transport stream by using an information generator; and
recording on a recording unit operable to store said transport packet that includes the added arrival time stamps and the information corresponding to discontinuity of the added arrival time stamps on a storage medium;
wherein when the arrival time stamp located in said storage medium is discontinuous, time of receipt timing outputs of the transport packet received from said information generator are controlled in accordance with the discontinuity information.

15. The method according to claim 14,
wherein a recording control circuit stores a playback management file of an original playback path corresponding to a transport stream in a storage media unit.

16. The method according to claim 15,
wherein said playback management file includes file names, times and addresses of an edited playback path and locations or points of time at each of which discontinuity of time stamps is generated.

17. A recording medium for recording a plurality of data streams, said plurality of data streams being recorded in accordance with the steps of:
extracting a program clock reference from a received transport stream;
generating an external clock signal synchronized with said program clock reference;
generating an arrival time stamp corresponding to a time of receipt of a transport packet in synchronization with said external clock signal;
formatting to add said arrival time stamp to the transport packet;
generating information representative of a transport packet corresponding to discontinuity of the added arrival time stamps in the transport stream by using an information generator; and
recording on a recording unit operable to store said transport packet that includes the added arrival time stamps and the information corresponding to discontinuity of the added arrival time stamps on a storage medium;
wherein when the arrival time stamp located in said storage medium is discontinuous, time of receipt timing outputs of the transport packet received from said information generator are controlled in accordance with the discontinuity information.

* * * * *